(No Model.)
H. F. BOND.
CENTRIFUGAL CREAMER.
No. 286,769. Patented Oct. 16, 1883.
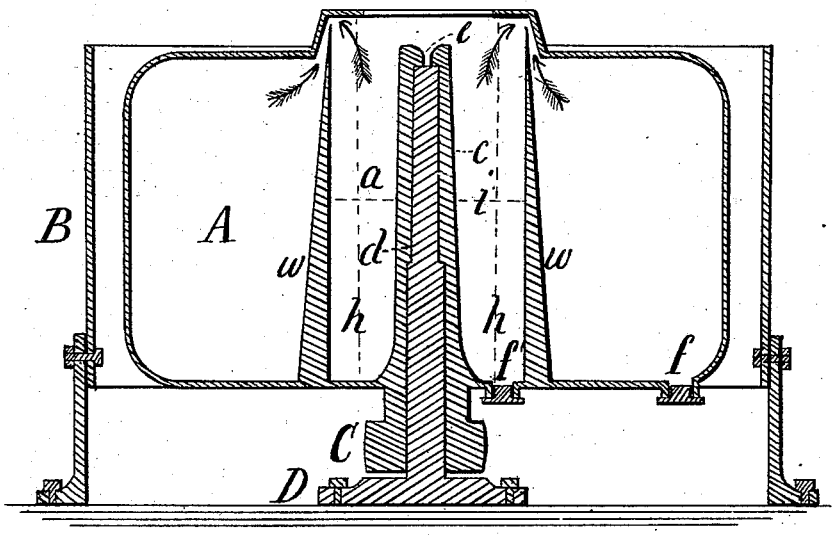
Witnesses
Edward Shinrock
Thomas A. Luske
Inventor
Henry Frederic Bond

UNITED STATES PATENT OFFICE.

HENRY F. BOND, OF WEST NEWTON, MASSACHUSETTS.

CENTRIFUGAL CREAMER.

SPECIFICATION forming part of Letters Patent No. 286,769, dated October 16, 1833.

Application filed April 4, 1883. (No model.)

*To all whom it may concern:*

Be it known that I, HENRY F. BOND, a citizen of the United States, residing at West Newton, in the county of Middlesex and State of Massachusetts, have invented a new and useful Improvement in Centrifugal Creamers, of which the following is a specification.

My invention relates to an improvement in those machines which are designed to separate by centrifugal force the constituents of milk, or of other liquids the constituents of which vary in specific gravity.

Various devices have been resorted to for the purpose of discharging the cream and skim-milk separately or into separate vessels, and so preventing the remixture of the ingredients when the liquid is allowed to remain in the machine and to come to a level when the machine is stopped. The devices for discharging the cream are somewhat expensive, and the violence with which the cream is discharged is thought to affect its consistency and to injure its quality. By my invention the cream and the skim-milk are retained in separate compartments, and may be drawn off separately after stopping the machine. I attain this object by the mechanism illustrated in the accompanying drawing, in which—

A represents a circular drum which is designed to revolve on the spindle $d$. $a$ represents a portion of drum A, separated from the rest by the concentric partition-wall $w$, which is cylindrical on the inside and conical on the outside. This partition-wall extends nearly up to the main top wall of drum A, a space of about one-sixteenth of an inch being left above and around it.

$c$ is a hollow shaft and part of drum A, fitted to turn easily on the spindle $d$, having base D, which is secured to the floor. Shaft $c$ is perforated for an oil-hole at $e$.

$f$ is a discharge-aperture for the skim-milk. $f'$ is a discharge-aperture for the cream. These may be closed tightly, when desired, by cocks, valves, faucets, or, as in the drawing, by screw-caps.

C is a pulley.

B is a cylindrical guard made of boiler-iron, wood, or other material.

To operate this machine the drum must be filled, while in rapid motion, as far or about as far as the dotted line $h$, the milk being forced in the operation over the wall $w$, and first filling the outer compartment of the drum. The rotary motion must then be continued five or ten minutes, or as long as is necessary, with the speed employed, to effect complete separation, the skim-milk in the inner compartment flowing over the wall $w$ into the outer compartment, and the cream in the outer compartment being crowded back over the wall $w$ into the inner compartment. Then by throwing off the belt, or by shipping onto a loose pulley, or by releasing a clutch, or by some similar action, the drum should be allowed to stop gradully to avoid all swashing over the wall $w$, when the cream will come to a level at or about the horizontal dotted line $i$ and in the inner compartment, and the skim-milk will be in the outer compartment and be prevented from mixing with the cream by the high partition-wall $w$. The skim-milk can then be drawn off at $f$ and the cream at $f'$. The conical form of the outside of the wall $w$ is to allow the cream to freely flow up the wall, and so prevent its adhesion to it. The cream from this machine is of superior quality in every respect.

I do not claim the use of a drum revolving on a perpendicular axis for centrifugal operations.

What I do claim as my invention, and desire to secured by Letters Patent, is—

1. In a centrifugal creaming-machine, the revolving drum divided into two compartments by the wall $w$, the inner surface of which is vertical, said wall extending nearly to the top of the drum, substantially as described.

2. In a centrifugal creaming-machine, the revolving drum divided into two compartments by the wall $w$, the inner surface of which is vertical and the outer surface cone-shaped, said wall extending nearly to the top of the drum, substantially as described.

HENRY FREDERIC BOND.

Witnesses:
EDWARD S. AMROCK,
THOMAS A. LASKE.